F. W. LANCHESTER.
DAMPING TORSIONAL VIBRATIONS IN CRANK SHAFTS.
APPLICATION FILED NOV. 28, 1910.
1,085,443.
Patented Jan. 27, 1914.
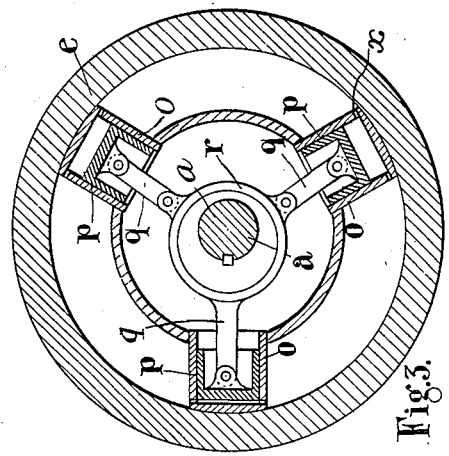
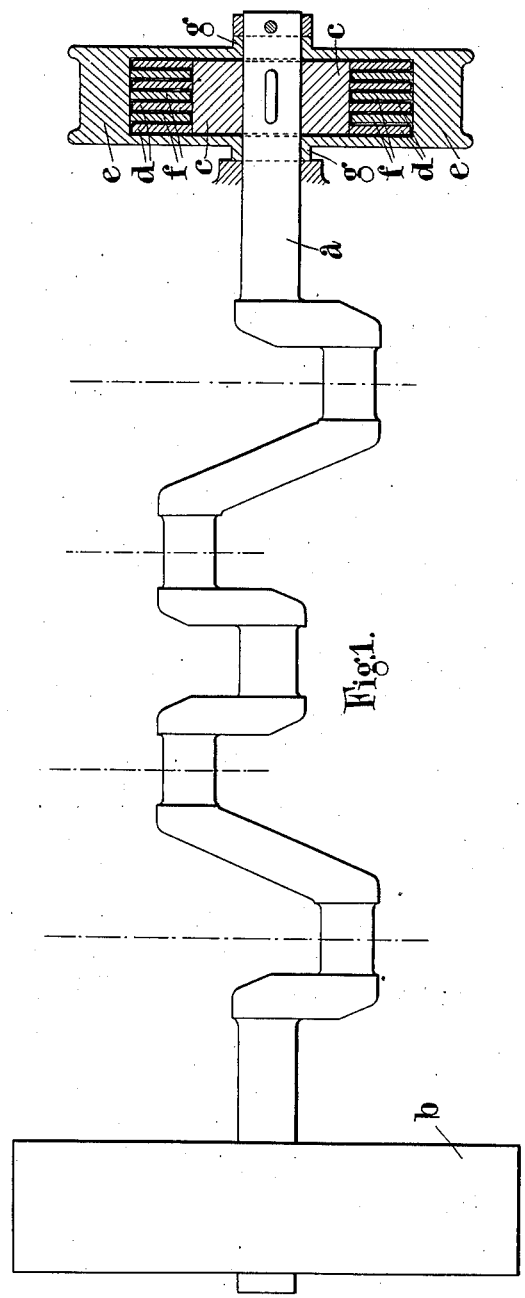
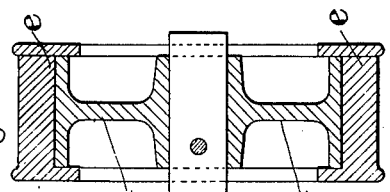
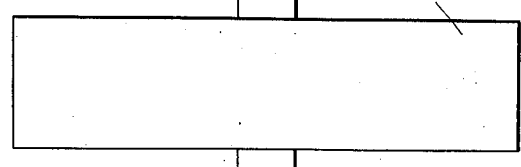
INVENTOR
Frederick William Lanchester
BY
ATTORNEYS

UNITED STATES PATENT OFFICE.

FREDERICK WILLIAM LANCHESTER, OF EDGBASTON, BIRMINGHAM, ENGLAND.

DAMPING TORSIONAL VIBRATIONS IN CRANK-SHAFTS.

1,085,443.    Specification of Letters Patent.    Patented Jan. 27, 1914.

Application filed November 28, 1910. Serial No. 594,474.

*To all whom it may concern:*

Be it known that I, FREDERICK WILLIAM LANCHESTER, a subject of the King of Great Britain and Ireland, and residing at 53 Hagley road, Edgbaston, Birmingham, in the county of Warwick, England, have invented certain new and useful Improvements for Damping Torsional Vibrations in Crank-Shafts, of which the following is a specification.

The present invention relates to improvements in high speed reciprocating engines, and more especially to an improved method of and apparatus for eliminating certain forms of vibration in the running of high speed multicylinder engines, such as the four and six cylinder internal combustion engines used for the propulsion of motor vehicles.

In apparatus requiring means for the elimination of torque variation it has been common to employ heavy flywheels for the purpose, such flywheels being attached to their shafts by non positive connections such as springs or cylinders and pistons coöperating through an elastic fluid, such elastic means being adapted to absorb excess energy during certain periods and to restore such energy to the system during certain succeeding periods. Again, when a heavy flywheel has been employed for eliminating torque variations in apparatus subjected to sudden stoppages, it has been common, in order to prevent rupture of the shaft, to attach the flywheel to its shaft by a device capable of slipping such as a friction clutch.

In high speed multicylinder internal combustion engines such as are used in vehicle propulsion the elimination of torque variations is effected in the usual way by the use of a heavy flywheel secured to the crank shaft. Such crank shafts present a new problem to the designer, however, for at certain speeds of rotation it is found that objectionable, and sometimes dangerous, torsional vibrations are set up, and the object of the present invention is to eliminate such vibrations.

A crank shaft for multicylinder reciprocating engines with several throws is a very elastic body, and is commonly loaded at one end or near one end by a flywheel of great moment of inertia, and is further loaded at different points along its length by inertia masses in the form of pistons, connecting rods, etc. These inertia masses act to a certain extent in the manner of a second flywheel, and this is especially the case in a six-throw crank. The crank shaft, therefore, is equivalent to a torsionally elastic shaft with a distribution of bodies having moments of inertia along its length and it will be seen that under these conditions, torsional vibration may be set up by any suitable exciting torque.

In multicylinder reciprocating engines, particularly internal combustion engines, such torques exist in the intermittent impulses of the explosions, and in the inertia effects of the reciprocating masses. The piston and connecting rod in reciprocation bring about a series of four alternations of torque on the crank shaft during each revolution. If the vibration were strictly of the character which exists when a single length of shaft is fitted with two flywheels rigidly attached, the resulting vibration would not be felt by the casing of the engine, because the whole of the torque variations in such a system are self-contained in the rotating elements, and therefore, the present invention does not apply to devices where parts in pure rotation are concerned. Where, however, the second rotational part exists partially or wholly in the form of reciprocating elements, the individual variations in the energy of these reciprocating elements result in considerable torque being set up, following the vibrations of the rotating system, but communicated to the stationary system of the engine. I have found that this form of vibration causes great trouble in the case of six-cylinder engines, as used in the automobile industry, and results in the production of violent vibrations, which are transmitted to the body of the car at and above certain definite speeds.

The object of the invention is to destroy or diminish the synchronous vibrations above referred to, and so to render an engine of light weight and comparatively non-rigid construction, free from vibration periods such as are commonly met with in engines at present in use.

The invention consists in means for eliminating torsional vibration in the crank shaft of a high speed reciprocating engine comprising a rotational damper consisting of a body of adequate moment of inertia connected to the crank shaft by a yielding coupling operating by friction between surfaces or by fluid, frictional or viscous action.

Referring to the accompanying drawings, Figure 1 shows a crank shaft of a four-cylinder motor with one form of my invention applied thereto; Fig. 2 shows a modified method of applying the invention; Fig. 3 shows a construction in which the coupling is effected by means of fluid pressure.

In carrying the invention into effect according to the modification shown in Fig. 1 there is keyed to the rotating shaft $a$ at the end farthest from the flywheel $b$ a coupling piece $c$ provided with ribs $d$ projecting outwardly. Over the coupling piece $c$ there is fitted a heavy wheel $e$ having internally projecting ribs $f$ projecting between the ribs $d$ of the coupling piece. The heavy wheel $e$ is provided with a bearing $g$ on the crank shaft. A suitable oil film is formed between the heavy wheel $e$ and its ribs and the coupling piece $c$. In this form of the invention if the shaft is rotating uniformly the heavy wheel $e$ is carried around at the same velocity as the shaft. If, however, owing to the action of the connecting rods on the shaft, there is at any given speed a tendency to set up torsional oscillations at the end $a$ of the shaft, these oscillations cause variations of speed between the end of the shaft $a$ and the uniformly moving heavy wheel $e$, and the pull between the coupling piece $c$ and the heavy wheel $e$ through the oil film will tend to damp out these oscillations.

In the form of the invention shown in Fig. 2 the heavy wheel $e$ is formed so that it takes a bearing on the wheel $h$ keyed to the shaft $a$, an oil film being provided between the wheels $e$ and $h$.

In the form of the invention shown in Fig. 3 the heavy wheel $e$ is provided with a number of cylinders $o$ in which work pistons $p$ connected by connecting rods $q$ with a sleeve $r$ keyed to the shaft $a$. The space between the pistons and the heads of the cylinders is filled with a suitable liquid, and suitable restricted passages $x$ are provided whereby this liquid can be forced out or in should there be a tendency to relative movement between the shaft and the heavy wheel.

In this form of the invention it is essential that the wheel should do some work.

Having thus described my invention what I claim as new and desire to secure by Letters Patent is:—

1. In a high speed reciprocating engine in combination a crankshaft having a number of cranks, a flywheel fixed on said crankshaft and means for preventing torsional vibration of said shaft including a second flywheel mounted on said crankshaft at a distance from said fixed flywheel and a yielding coupling connecting said second flywheel to said crankshaft.

2. In a high speed reciprocating engine in combination a crankshaft having a plurality of cranks, a flywheel fixed at one end of said crankshaft and means for preventing torsional vibration of said shaft including a second flywheel applied to said crankshaft at a distance from said first flywheel and a fluid frictional coupling connecting said second flywheel to said crankshaft.

3. In a high speed reciprocating engine in combination a crankshaft having a plurality of cranks, a flywheel fixed at one end of said crankshaft and means for preventing torsional vibration of said shaft including a member attached to said crankshaft at a distance from said flywheel said member having a projecting surface, a heavy wheel having a surface opposed to said projecting surface and an oil film between said surfaces, as set forth.

4. In a high speed reciprocating engine in combination a crankshaft having a plurality of cranks, a flywheel fixed at one end of said crankshaft and means for preventing torsional vibration of said shaft including a member keyed to the other end of said crankshaft, a number of disks attached to said member and projecting in a radial direction, a second flywheel, a number of rings projecting from said flywheel between said disks, and oil films between said rings and disks, as set forth.

In testimony whereof I have signed my name to this specification in the presence of two subscribing witnesses.

FREDERICK WILLIAM LANCHESTER.

Witnesses:
JOHN MORGAN,
HARRY DAVIS.